(12) United States Patent
Toyoda et al.

(10) Patent No.: US 6,476,455 B2
(45) Date of Patent: Nov. 5, 2002

(54) INFRARED SENSOR

(75) Inventors: Inao Toyoda, Okazaki (JP); Kazuaki Hamamoto, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/983,109

(22) Filed: Oct. 23, 2001

(65) Prior Publication Data

US 2002/0050623 A1 May 2, 2002

(30) Foreign Application Priority Data

Oct. 26, 2000 (JP) ........................................ 2000-327288
Sep. 20, 2001 (JP) ........................................ 2001-287544

(51) Int. Cl.[7] ...................... H01L 31/0232; H01L 31/00
(52) U.S. Cl. ..................... 257/436; 257/447; 257/448; 257/459; 257/460; 257/467
(58) Field of Search ............................... 257/436, 443, 257/444, 447, 448, 459, 460, 467

(56) References Cited

U.S. PATENT DOCUMENTS 5,798,684 A * 8/1998 Endo et al. ............... 338/22 R
6,339,187 B1 * 1/2002 Inoue ........................ 136/225
6,388,255 B1 * 5/2002 Di Maio et al. ......... 250/338.2

FOREIGN PATENT DOCUMENTS

JP    A-3-276772    12/1991

OTHER PUBLICATIONS

Lahiji and Wise, "A Batch–Fabricated Silicon Thermopile Infrared Detector", *IEEE Transactions on Electron Devices*, vol. ED–29, No. 1, Jan., 1982.
Choi and Wise, "A Silicon–Thermopile–Based Infrared Sensing Array for Use in Automated Manufacturing", *IEEE Transactions on Electron Devices*, vol. ED–33, No. 1 Jan., 1986.

* cited by examiner

Primary Examiner—Ngân V. Ngô
(74) Attorney, Agent, or Firm—Law Offices of David G. Posz

(57) ABSTRACT

An infrared sensor includes a concavity made on a side of a semiconductor substrate and a plurality of sensing areas formed in a thin film area on the back side of the bottom of the concavity. Groups of two thermocouples, three thermocouples and four thermocouples reside in a sensing area in the central part of the thin film area, in another sensing area adjacent the central sensing area and in yet other sensing areas adjacent to the central sensing area, respectively, to compensate for the heterogeneity of heat transfer in the thin film area. Therefore, sensitivity loss is suppressed in the sensing area having a boundary with the substrate. More specifically, the difference in sensitivity between the sensing areas is reduced.

17 Claims, 3 Drawing Sheets

INFRARED SENSOR

CROSS REFERENCE TO RELATED APPLICATION

This application is based on and incorporates herein by reference Japanese Patent Application No. 2001-287544 filed on Sep. 20, 2001 and Japanese Patent Application No. 2000-327288 filed on Oct. 26, 2000.

BACKGROUND OF THE INVENTION

1. Field of the Invention

The present invention relates to an infrared sensor and, more particularly, to a design of a sensing area including thermocouples and an infrared absorbing film in the sensor.

2. Description of the related Art

In general, an infrared sensor includes a concavity made on a side of a semiconductor substrate and a plurality of sensing areas formed in a thin film area at the back side of the bottom of the concavity. The sensor makes it possible to quickly measure the temperature of an object without making contact with the object. Additionally, the sensing areas have a boundary with the substrate in the periphery of the thin film area which is susceptible to heat loss due to heat conduction of the substrate. Therefore, the sensing areas in the periphery of the thin film area have a greater thermal capacity than the sensing areas in the central part of the thin film. Thus, the proposed sensor has a sensitivity deviation among the sensing areas.

SUMMARY OF THE INVENTION

Thus, it is an objective of the present invention to provide an infrared sensor that has a reduced sensitivity deviation among the sensing areas. That is, a more consistent thermal conduction of the sensing areas is desired.

According to the present invention, it is possible to generate greater electromotive force in the sensing area having a boundary with the substrate by means described hereinafter.

More thermocouples are provided in the sensing areas having a boundary with the substrate than in the sensing areas having no boundary with the substrate. The difference in the number of thermocouples between those sensing areas compensates for the heterogeneity of heat transfer in the thin film area due to the heat loss of the sensing areas having a boundary with the substrate. Therefore, the sensitivity becomes homogeneous among the sensing areas.

A larger infrared absorbing film is formed in the sensing area having a boundary with the substrate as compared to the sensing area having no boundary with the substrate. The difference in size of the film between those sensing areas compensates for the heterogeneity of heat transfer in the thin film area caused by the heat loss of the sensing area having the boundary with the substrate. Therefore, the sensitivity becomes homogeneous among the sensing areas.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The invention, together with additional objectives, features and advantages thereof, will be best understood from the following detailed description, the appended claims and the accompanying drawings in which:

DETAILED DESCRIPTION OF THE PREFERRED EMBODIMENT

The present invention will be described in detail with reference to various embodiments.

(First Embodiment)

Figure 1:
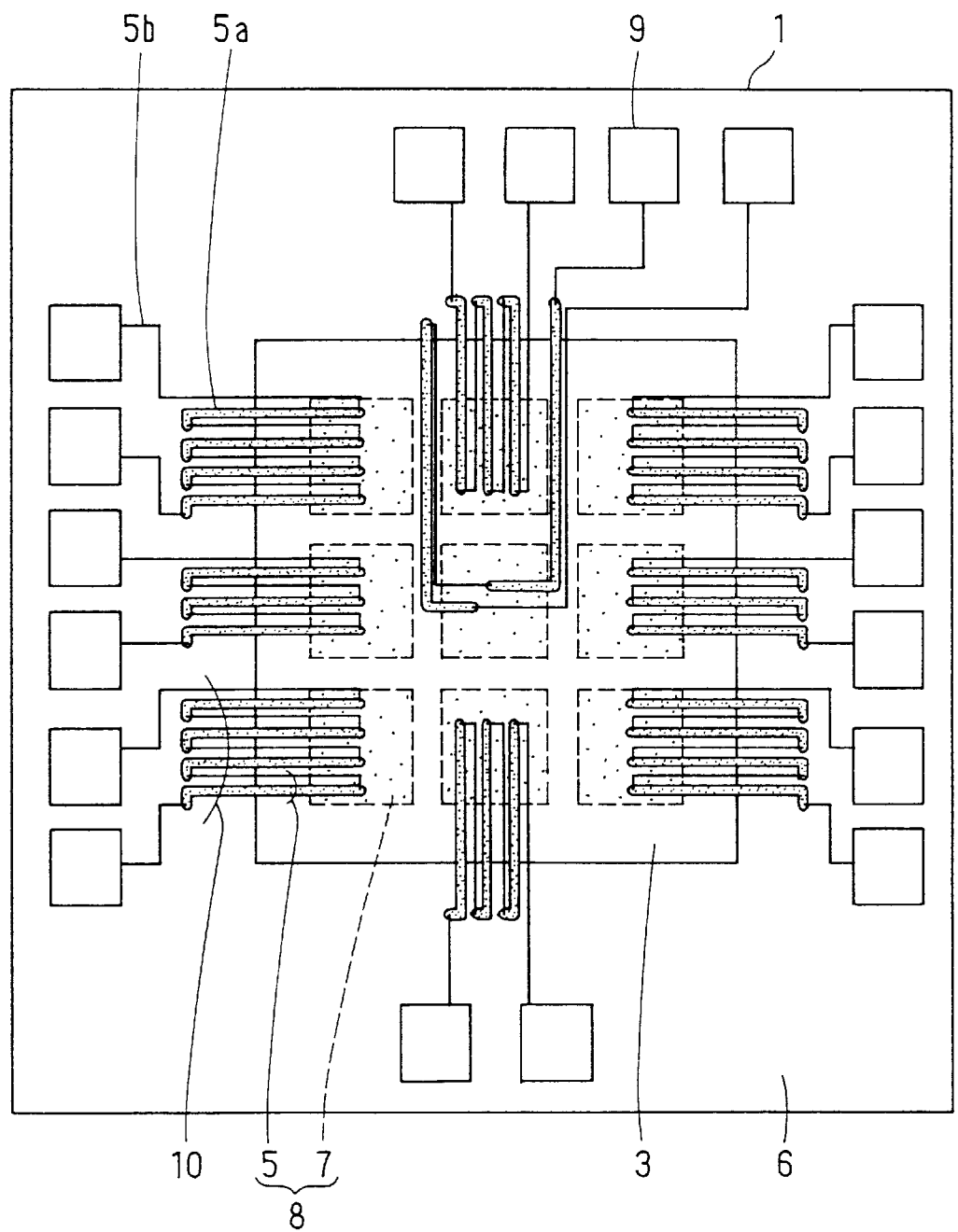
FIG. 1 is a plan view of an infrared sensor according to a first embodiment of the present invention.
Figure 2:
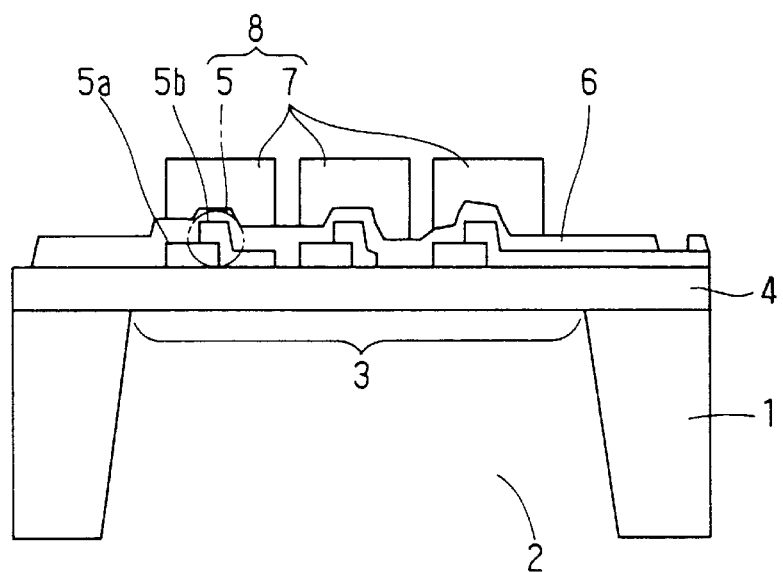
FIG. 2 is a cross-sectional view of the infrared sensor.

An infrared sensor according to a first embodiment shown in FIGS. 1 and 2 is, for one example, utilized in an automatic air conditioner for measuring the inside temperature of a vehicle.

An infrared sensor chip includes a thin film area 3 made of a silicon oxide film 4 at the bottom of a concavity 2 that is made by selectively etching a portion of a single crystal silicon substrate 1. Nine rectangular infrared absorbing films 7 are arranged in a three-by-three matrix, with equal spacing between the films, in the rectangular thin film area 6. A plurality of polysilicon lines 5a and a number of aluminum lines 5b extend from the infrared absorbing film 7 to an outside of the thin film area 3 and are alternately disposed in parallel on the thermal silicon oxide film 4. The polysilicon lines 5a and the aluminum lines 5b are connected in series to form a thermopile 10 consisting of a plurality of thermocouples 5. A thermocouple 5 consists of a polysilicon line 5a and an aluminum line 5b. A contact point of the polysilicon line 5a and the aluminum line 5b make a hot junction and a cold unction, respectively, under the infrared absorbing film 7 on the silicon oxide film 4 outside the thin film area 3. One thermopile 10 is formed under each of the nine infrared absorbing films 7. A sensing area 8 includes a plurality of hot junctions formed in the thin film area 3. A piece of dielectric film 6 rests on the hot junctions and the infrared absorbing film 7 covers the hot junctions with the dielectric film 6 sandwiched in-between, as shown in FIGS. 1 and 2. Specifically, nine sensing areas 8 are formed in the thin film area 3. Aluminum pads 9 are formed at both ends of the thermopile 10 and connect electrically with the aluminum lines 5b for picking up a signal generated by the thermopile 10.

Figure 3:
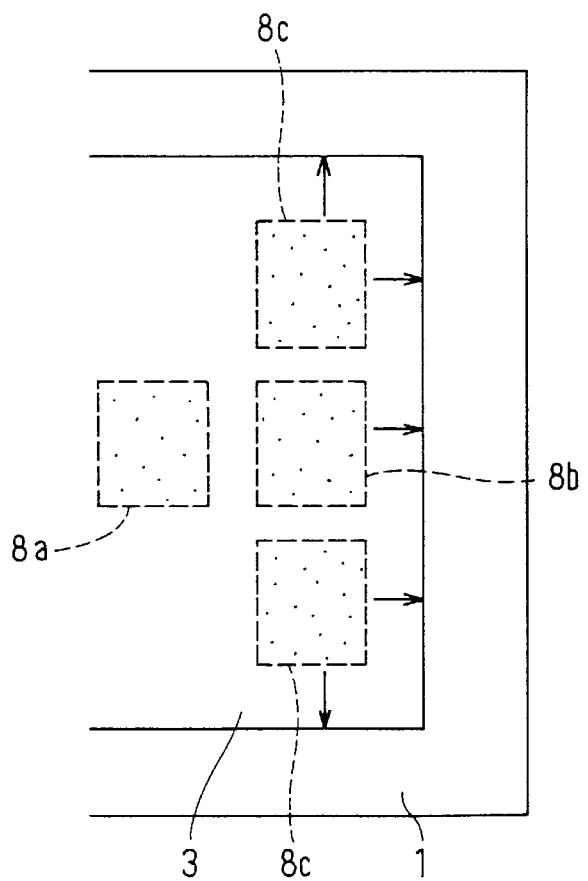
FIG. 3 is an enlarged, fragmentary, plan view of the infrared sensor in which a thermocouple is not shown.

As shown in FIG. 3, the heat generated at sensing areas 8b and 8c adjacent to the silicon substrate 1 transfers to the silicon substrate 1 in the directions indicated by the arrows. The sensing area 8b adjacent to sensing area 8a, formed in the central part of the thin film area 3, has one heat transfer direction while the sensing area 8c situated diagonally to sensing area 8a has two heat transfer directions. Consequently, the more boundaries the sensing area 8 has with the substrate 1, the greater the heat loss by sensing area 8. Therefore, the sensing area 8b is more susceptible to heat loss in comparison with the sensing area 8a, while sensing areas such as 8c are more susceptible to heat loss than sensing areas 8a and 8b.

In the first embodiment, a group of two thermocouples, a group of three thermocouples and a group of four thermocouples are formed in the sensing area 8a. Like groupings of thermocouples are formed in sensing area 8b, and in each of the other sensing areas, respectively, to compensate for any heterogeneity of heat transfer in the thin film area 3. Therefore, the sensing areas 8b and 8c generate greater and greater electromotive forces than sensing area 8a does, so that sensitivity loss in each of the sensing areas 8b and 8c is suppressed. Thus, the difference in sensitivity between the sensing areas is reduced.

A fabrication method of the infrared sensor will now be described. The thermal silicon oxide film 4 is formed on a side of the silicon substrate 1. A silicon nitride film may be used instead of the thermal silicon oxide film 4. Desired patterns of the n-type polysilicon lines 5a and the aluminum lines 5b are defined on the silicon oxide film 4 to form the thermocouples 5. The thermocouple 5 is a pair of two conductive or semi-conductive materials that have a different Seebeck coefficient from each other. In the first embodiment, the thermocouples 5 comprise the n-type polysilicon line 5a and the aluminum line 5b. The dielectric film 6 is deposited on the thermocouples 5. A wire-bonding place is made by means of opening a part of the film 6 on the aluminum pad 9. An anisotropic etching using an etchant such as KOH (Potassium Hydroxide) is applied to a partially masked surface on the semiconductor substrate 1 to form the concavity 2 and thereby form the thin film area 3. The infrared absorbing film 7 made from gold black (made of small particles of gold) are deposited by vacuum evaporation on the thermocouples 5 with the dielectric film 6 sandwiched in-between.

The silicon substrate 1 is divided into each sensor chip by means of a method such as a dicing cut. The infrared sensor chip is assembled on a stem (not shown in a figure) with an adhesive such as silver paste. A bonding wire electrically connects the sensor chip and a pin. A cap (not shown in a figure) and the stem are welded together and sealed to finalize the sensor fabrication.

(Second Embodiment)

Figure 4:
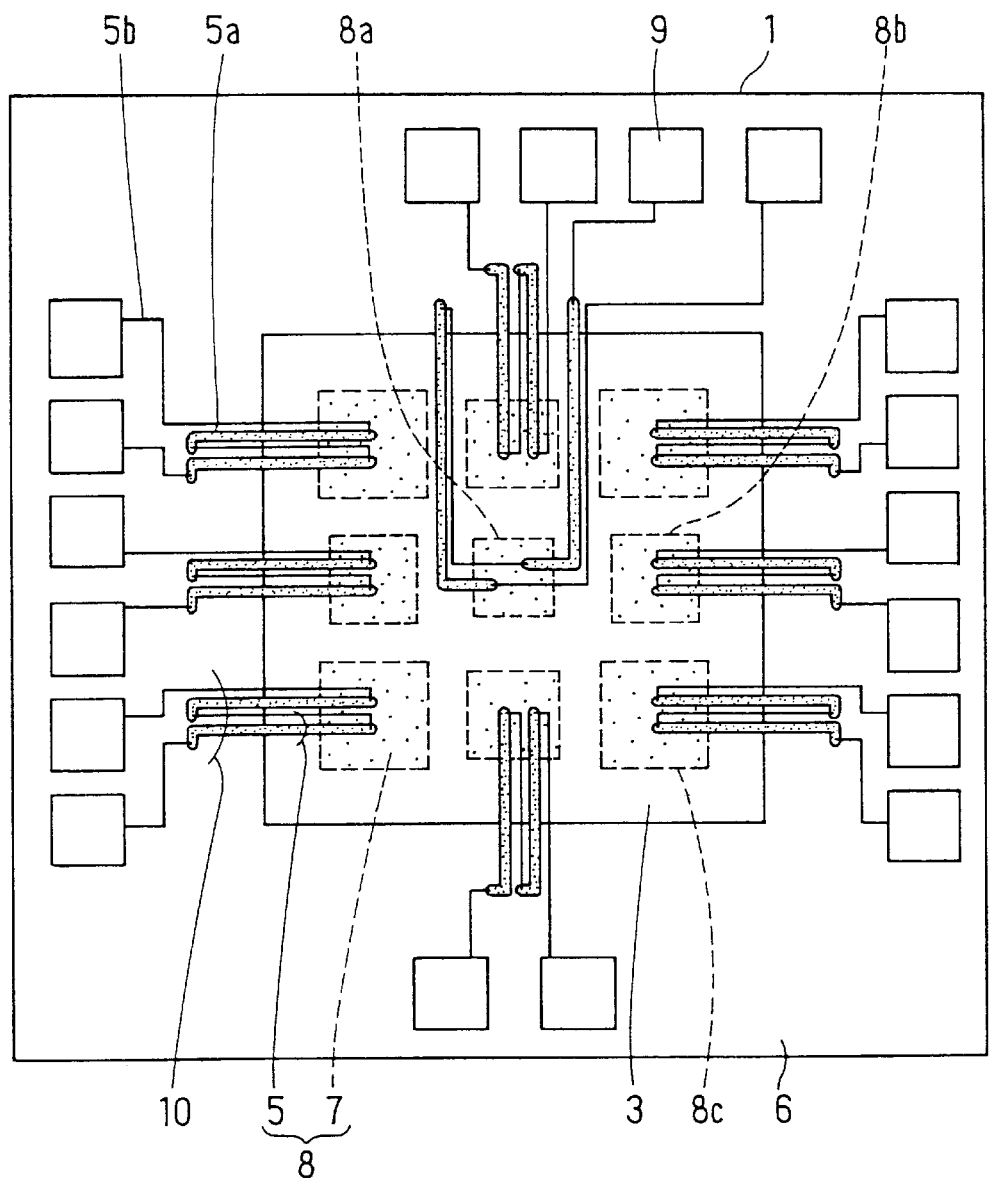
FIG. 4 is a plan view of an infrared sensor according to a second embodiment of the present invention.

In the second embodiment of FIG. 4, the size of the infrared absorbing films 7 is a major difference from the first embodiment. The sensing area 8a in the central part of the thin film area 3 has a smaller infrared absorbing film 7 compared to the sensing area 8b adjacent to the sensing area 8a, while the sensing area 8b has a smaller infrared absorbing film 7 compared to the sensing area 8c adjacent to the sensing area 8b. Generally, the closer the sensing area 8 is to the periphery of the thin film area 3, the larger the infrared absorbing film 7 is. Thereby, the sensing areas 8b and 8c generate greater and further greater electromotive forces than the sensing area 8a does, respectively, so that sensitivity loss in the sensing areas 8b and 8c is suppressed. Thus, the difference in sensitivity between the sensing areas is reduced.

(Other Embodiment)

The first embodiment and the second embodiment may be combined in such a case that there are some limitations in the arrangement of the thermocouples 5 or in the size or the thickness of the infrared absorbing film 7. Namely, both embodiments may be combined in such a manner that the closer the sensing area 8 is to the periphery of the thin film area 3, the more thermocouples 5 and the larger infrared absorbing film 7 the sensing area 8 will have. Thereby, respective advantages of the two embodiments described hereinbefore are provided so that one embodiment compliments the other.

The above embodiment may be modified further within the spirit of the present invention. For example, in the embodiments described, the thermocouple 5 is a pair consisting of the n-type polysilicon line 5a and the aluminum line 5b, however, the thermocouple 5 may be a pair of two other conducting or semiconducting materials that have a different Seebeck coefficient from each other. In addition, in the first embodiment, a group of two thermocouples 5, three thermocouples 5 and four thermocouples 5 are formed in the sensing area 8a, in another sensing area 8b and, still further, in other sensing areas 8c, respectively, to compensate for the heterogeneity of heat transfer in the thin film area 3. However, other numerical combinations of the thermocouples 5 may be assigned to the sensing areas 8.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A semiconductor device comprising:

a semiconductor substrate with a concavity;

a plurality of thermocouples including a wiring member and an electrode member formed in a thin film area on a back side of a bottom of the concavity;

an infrared absorbing film formed on the thermocouples; and a plurality of sensing areas including the thermocouples and the infrared absorbing film, wherein the thermocouples in the sensing area in a periphery of the thin film area outnumber the thermocouples in the sensing area in a central part of the thin film area.

2. The semiconductor device according to claim 1, wherein the sensing area that has the most heat transfer channels to the substrate has the most thermocouples.

3. The semiconductor device according to claim 1, wherein the sensing area in the central part of the thin film area has less thermocouples than another sensing area adjacent to the sensing area in the central part; and the another sensing area includes less thermocouples than other sensing areas, except the sensing area in the central part.

4. The semiconductor device according to claim 3, wherein the plurality of sensing areas are arranged in a matrix; and the other sensing areas are disposed on a diagonal of the matrix.

5. A semiconductor device comprising:

a semiconductor substrate with a concavity on the substrate;

a plurality of thermocouples including a wiring member and an electrode member formed in a thin film area on a back side of a bottom of the concave;

an infrared absorbing film formed on the thermocouples; and a plurality of sensing areas including the thermocouples and the infrared absorbing film, wherein the infrared absorbing film of the sensing area in a periphery of the thin film area is larger than that in the sensing area in a central part of the thin film area.

6. The semiconductor device according to claim 5, wherein the sensing area that has the most heat transfer channels to the substrate has the largest infrared absorbing film.

7. The semiconductor device according to claim 5, wherein the infrared absorbing film of the sensing area in the central part of the thin film area is smaller than that of another sensing area adjacent to the sensing area in the central part; and the infrared absorbing film of the another sensing area is smaller than that of other sensing areas, except the sensing area in the central part.

8. The semiconductor device according to claim 7, wherein the plurality of sensing areas are arranged in a matrix shape; and the other sensing areas are disposed on a diagonal of the matrix.

9. The semiconductor device according to claim 1, wherein the sensing area having the most heat transfer channels to the substrate has the largest boundary with the substrate.

10. A semiconductor device comprising:

a semiconductor substrate with a concavity on the substrate;

a plurality of thermocouples including a wiring member and an electrode member formed in a thin film area on a back side of a bottom of the concave;

an infrared absorbing film formed on the thermocouples; and a plurality of sensing areas including the thermocouples and the infrared absorbing film, wherein sensitivity of the sensing area in a periphery of the thin film area is greater than that of the sensing area in a central part of the thin film area.

11. The semiconductor device according to claim 5, wherein the sensing area having the most heat transfer channels to the substrate has the largest boundary with the substrate.

12. A semiconductor device comprising:

a substrate having a concavity on a first side;

a silicon oxide film located adjacent to the concavity;

a plurality of thermocouples located on a side of the silicon oxide film opposite to the concavity;

wherein the thermocouple is comprised of a polysilicon portion and an aluminum portion;

a dielectric film located on a side of the thermocouples opposite the silicon oxide film, wherein the dielectric forms a layer over the thermocouples and makes contact with the silicon oxide layer between the thermocouples; and an infrared absorbing film covering the thermocouples with the dielectric film sandwiched in-between the infrared absorbing film and the thermocouples, wherein the thermocouples and the infrared absorbing film comprise a sensing area, the sensing area located in a peripheral portion of a thin film area and in a central portion of a thin film area.

13. The semiconductor device according to claim 12, wherein the thermocouples are arranged in different quantities based upon a location of a particular sensing area relative to the thin film area.

14. The semiconductor device according to claim 12, wherein two thermocouples, three thermocouples and four thermocouples reside in the sensing area in the central part of the thin film area and in the sensing area in the peripheral portion of the thin film area to compensate for heterogeneous heat transfer in the thin film area.

15. The semiconductor device according to claim 12, wherein the infrared absorbing film of the sensing area in the central part of the thin film area is smaller than that of another sensing area adjacent to the sensing area in the central part;

and the infrared absorbing film of the another sensing area is smaller than that of other sensing areas, except the sensing area in the central part.

16. The semiconductor device according to claim 15, wherein the plurality of sensing areas are arranged in a matrix shape; and the other sensing areas are disposed on a diagonal of the matrix.

17. The semiconductor device according to claim 16, wherein the sensing area having the most heat transfer channels to the substrate has the largest boundary with the substrate.

* * * * *